United States Patent
Albarran

(10) Patent No.: US 8,961,675 B2
(45) Date of Patent: Feb. 24, 2015

(54) ACOUSTIC BUILDING MATERIAL EMPLOYING CHITOSAN

(75) Inventor: Enrique L. Albarran, Waukegan, IL (US)

(73) Assignee: USG Interiors, LLC, Chicago, IL (US)

( * ) Notice: Subject to any disclaimer, the term of this patent is extended or adjusted under 35 U.S.C. 154(b) by 635 days.

(21) Appl. No.: 13/294,200

(22) Filed: Nov. 11, 2011

(65) Prior Publication Data

US 2012/0161058 A1 Jun. 28, 2012

Related U.S. Application Data

(60) Provisional application No. 61/427,643, filed on Dec. 28, 2010.

(51) Int. Cl.
| | | |
|---|---|---|
| *C08L 3/02* | (2006.01) | |
| *C08L 5/08* | (2006.01) | |
| *C08L 97/02* | (2006.01) | |
| *E04B 9/00* | (2006.01) | |
| *E04B 9/04* | (2006.01) | |
| *E04F 13/16* | (2006.01) | |

(52) U.S. Cl.
CPC ............ *E04B 9/001* (2013.01); *C08L 2666/26* (2013.01); *C08L 5/08* (2013.01); *C08L 3/02* (2013.01); *C08L 97/02* (2013.01); *E04B 9/04* (2013.01); *E04B 2103/02* (2013.01); *E04F 13/16* (2013.01)
USPC .......................... 106/122; 106/162.2; 524/29

(58) Field of Classification Search
USPC .................................. 106/122, 162.2; 524/29
See application file for complete search history.

(56) References Cited

U.S. PATENT DOCUMENTS

| 1,769,519 | A | * | 7/1930 | King et al. ..................... 428/141 |
|---|---|---|---|---|
| 5,250,153 | A | * | 10/1993 | Izard et al. ..................... 162/152 |
| 5,395,438 | A | * | 3/1995 | Baig et al. ................ 106/164.51 |
| 8,028,803 | B1 | * | 10/2011 | Englert ........................ 181/294 |
| 8,133,354 | B2 | * | 3/2012 | Baig .......................... 162/181.3 |
| 2006/0182981 | A1 | | 8/2006 | Debergalis et al. |
| 2006/0194026 | A1 | | 8/2006 | Blair et al. |
| 2009/0068430 | A1 | | 3/2009 | Troger et al. |
| 2009/0252922 | A1 | | 10/2009 | Debergalis et al. |

FOREIGN PATENT DOCUMENTS

| CN | 103205043 A | * | 7/2013 |
|---|---|---|---|
| JP | 08-290949 A | | 11/1996 |
| JP | 2001-316162 A | | 11/2001 |
| WO | 00 17121 A1 | | 3/2000 |

OTHER PUBLICATIONS

Notification of Transmittal of the International Search Report and the Written Opinion of the International Searching Authority, or the Declaration, International Application No. PCT/US2011/064148, filed Dec. 9, 2011; International Search Report and Written Opinion dated Jun. 27, 2012.

* cited by examiner

*Primary Examiner* — David M Brunsman
(74) *Attorney, Agent, or Firm* — Pearne & Gordon LLP

(57) ABSTRACT

An acoustic building material and method for manufacture incorporates chitosan in an amount sufficient to achieve acceptable physical properties with a reduction in binder and to allow the postindustrial/postconsumer content of the building material to be increased. The chitosan also enhances the dewatering of the building material.

18 Claims, No Drawings

ACOUSTIC BUILDING MATERIAL EMPLOYING CHITOSAN

This application claims the priority of U.S. Provisional Application No. 61/427,643, filed Dec. 28, 2010.

FIELD OF INVENTION

The field relates to an acoustic building material or fiber board as well as a method for its manufacture, and more particularly, to fiber board containing homogenously dispersed chitosan within the board construction.

BACKGROUND OF INVENTION

The acoustic building material or fiber board may be in the form of a ceiling tile, a ceiling panel, a wall panel or wall tile as are well known in the building trades. The boards are prepared from a slurry of fibers, fillers and binders.

The boards are typically prepared using the slurry in a water felting process as is known in the art. A dispersion of fiber, filler, binder and other ingredients flow onto a moving, porous support such as a Fourdrinier forming machine for dewatering. The dispersion is dewatered first by gravity and then by vacuum suction. The wet base mat is dried and the dried material is cut to the desired dimensions and optionally top coated to produce the fiber board panels or tiles.

Chitosan or poly-D-glucosamine is commercially available as a deacetylated form of chitin which is a structural element in the exoskeleton of crustaceans and the cell walls of certain fungi. It is a cationic polymer similar to cellulose. Chitosan has been found to promote blood clotting and it has been used in bandages. It is a biocide and has special properties that enhance antimicrobial and antifungal activities. Chitosan is also used as a flocculent in the water filtration of heavy metals. Chitosan is also indicated to absorb formaldehyde and odor.

BRIEF DESCRIPTION OF THE INVENTION

Chitosan has been found to be a multifunctional additive to fiber board that may be incorporated directly into the slurry formulation. The chitosan is dissolved in acid and added directly to the slurry as a dilute solution. In this manner, the chitosan is uniformly dispersed through the board construction with no substantial change in the manufacturing process.

The use of chitosan in fiber board constructions enables a number of advantages in the resulting product. For example, chitosan concentrations less than about 10 wt % provide structural reinforcement sufficient to permit reduction of the amount of binder. This results in a cost saving since the binder is an expensive ingredient in the fiber board composition.

A further advantage of incorporating chitosan in board constructions is that it enhances and contributes to the binding of the components and enables recycle content to be increased. That is, the amount of binder may be decreased and increased amounts of recycle cellulose may be used.

Most surprisingly, the incorporation of chitosan in the board construction has also been found to enhance dewatering or water removal from the board constructions as they are formed and to reduce the drying requirement. In the felting process, the water removal from the board construction is improved prior to the oven drying step and the amount of drying required is reduced. In board construction processing including chitosan in accordance with the invention, the amount of water removed in the dewatering steps prior to oven drying is increased and therefore the amount of water to be removed in a final oven drying step is decreased. The reduced oven drying requirement saves energy and expense.

The biocidal properties of chitosan are directly useful in ceiling and wall applications. These properties are especially valuable in ceiling tile applications where high humidity, condensation or other sources of moisture are likely to wet the tile. Such high humidity environments are friendly to undesirable microbial and fungal growth which may be deposited by airborne transfer.

The ability of chitosan to absorb formaldehyde is believed to reduce both process and product formaldehyde levels. The odor absorbing properties of chitosan are particularly useful in product applications.

DETAILED DESCRIPTION OF THE INVENTION

As indicated above, chitosan has been found to provide desirable characteristics to acoustical building materials or fiber boards as a multifunctional additive. For convenience, the invention is described below with particular reference to ceiling tiles which may be used in a suspended ceiling.

The ceiling tiles of interest herein include base fibers that are usually mineral fibers such as mineral wool or glass fibers and organic fibers such as cellulose fibers. The fillers are commonly perlite, clay, calcium carbonate, or stucco gypsum. The binder is typically starch, latex, or similar materials. These materials or ingredients are typically combined in aqueous slurry and processed in a water felting process as described above.

In typical compositions, the fiber and filler components comprise the primary ingredients. However, a wide variation of ingredients may be employed. For example, the following chart summarizes typical ceiling and wall compositions. It should be appreciated that compositions may contain one or more of the illustrative types of fiber, filler or binder as listed in the following table. The percentages herein are weight percent based on solids unless otherwise indicated by comment or context.

| Ingredient | Range % | Preferred % |
| --- | --- | --- |
| Fiber | | |
| Mineral wool | 5-65% | 19-35% |
| Glass fiber | 5-65% | 19-35% |
| Cellulose fiber (recycle paper) | 0-25% | 18% |
| Filler | | |
| Perlite | 15-70% | 30-52% |
| Clay | 0-25% | 4% |
| Calcium carbonate | 0-20% | 10% |
| Binder | | |
| Corn starch | 3-12% | 8% |
| Latex | 0-5% | 3% |
| Chitosan | 1-6% | 2% |

The fiber, filler and binder components are combined in aqueous slurry at a level of about 3% to 6% solids in a known manner. The chitosan is dissolved in an acidic aqueous solution and homogenously blended into the slurry. For example, the chitosan in powder or chip form may be dissolved in a 2-4% by volume acetic acid solution and added to the slurry.

The chitosan solution is added in an amount that provides a final product weight basis amount in the range of 1% to 6% based on the solids contained in the slurry.

It is believed that the hydrophilic OH and NH groups present in the chitosan enhance the uniform distribution of the chitosan and the thorough penetration and/or contact with the fiber and filler slurry ingredients. Also, the cationic charged chitosan is believed to interact with the starch. Further, the chitosan appears to form a fiber-like structure that is intertwined and/or otherwise interacted with the other fiber components of the tile to provide a structural reinforcement that enables the amount of binder to be reduced with acceptable limited change in the tile physical properties.

As described above, the addition of chitosan to board constructions for ceiling tile or the like reduces the amount of water retained by the construction as it is formed prior to oven drying. The felting process may include natural drainage, application of vacuum and/or roll pressing of the board in order to remove water prior to oven drying. The use of chitosan in accordance with the invention has been found effective to enhance water removal when used with one or more of the foregoing pre-oven drying processes. Accordingly, a chitosan containing board in accordance with the present invention contains less water prior to oven drying than an identically formed board construction having the same composition except for the addition of chitosan.

The following illustrative examples compare boards corresponding with the core of the tile and do not include outer coatings, holes or other finish treatments. The board composition includes mineral wool, recycle newsprint, starch from corn, calcium carbonate, perlite and flocculent. It has been empirically determined that the amount of corn starch is preferably about 8 wt % to provide the desired acoustic, strength and other properties. Herein, the board composition was modified to incorporate various amounts of chitosan and reduced amounts of starch to demonstrate the binding and reinforcing properties of chitosan.

The absolute amounts of components contained in the prepared boards are reported in following Table 1.

TABLE 1

| | Formulations (by Dry Weight) | | | | | | |
|---|---|---|---|---|---|---|---|
| Board # | Mineral Wool (g) | News (g) | Chitosan (g) | Corn Starch (g) | Calcium Carbonate (g) | Perlite (g) | Flocculent (g) |
| 1 | 42.4 | 73.3 | 0.0 | 30.8 | 38.6 | 200.5 | 0.3 |
| 2 | 42.2 | 72.9 | 1.9 | 30.7 | 38.4 | 199.5 | 0.3 |
| 3 | 42.6 | 73.6 | 1.9 | 27.1 | 38.7 | 201.5 | 0.3 |
| 4 | 43.1 | 74.4 | 2.0 | 23.5 | 39.1 | 203.5 | 0.3 |
| 5 | 43.9 | 75.9 | 2.0 | 16.0 | 40.0 | 207.8 | 0.3 |

Board 1 provides a control with no added chitosan and the typical amount of starch. Boards 2-5 contain increasing amounts of chitosan and decreasing amounts of binder starch.

The weight percent by parts of the various components for Boards 1-5 is shown in Table 2.

TABLE 2

| | Formulation (% by Parts) | | | | | | |
|---|---|---|---|---|---|---|---|
| Board # | % Mineral Wool | % News | % Chitosan | % Corn Starch | % CaCO$_3$ | % Perlite | % Flocculent |
| 1 | 11 | 19 | 0.0 | 8 | 10 | 52 | 0.08 |
| 2 | 11 | 19 | 0.5 | 8 | 10 | 52 | 0.08 |
| 3 | 11 | 19 | 0.5 | 7 | 10 | 52 | 0.08 |
| 4 | 11 | 19 | 0.5 | 6 | 10 | 52 | 0.08 |
| 5 | 11 | 19 | 0.5 | 4 | 10 | 52 | 0.08 |

Boards 1-5 were tested and the results are set forth in below Table 3. The following test procedures were used in determining the test results reported in Table 3.

The MOR test for modulus of rupture is a 3-point bend test. The test procedure herein is similar to ASTM C 367 Standard Test Methods for Strength Properties of Prefabricated Architectural Acoustical Tile or Lay-In Ceiling Panels. The hardness test indicates a ceiling tiles ability to resist indentation which may occur during installation or post-installation. The 2" ball hardness test used herein is similar to ASTM C 367 Standard Test Methods of Strength Properties of Prefabricated Architectural Tile or Lay-In Ceiling Panels.

TABLE 3

Physical Measurements; MOR; Hardness

| Board # | Sample | Weight (g) | Length (in) | Width (in) | Caliper (in) | Density (lb/ft³) | MOR (psi) | Breakload (lb) | Hardness (lbf) |
|---|---|---|---|---|---|---|---|---|---|
| 1 | A | 49.64 | 10.037 | 3.029 | 0.679 | 9.16 | 64.3 | 7.48 | 103.6 |
|   | B | 49.77 | 10.037 | 3.029 | 0.684 | 9.11 | 61.8 | 7.30 | 90.2 |
|   | C | 50.51 | 10.037 | 3.029 | 0.696 | 9.08 | 61.8 | 7.55 | 106.2 |
|   | Average | 49.97 | 10.037 | 3.029 | 0.686 | 9.12 | 62.6 | 7.44 | 100.0 |
|   | STDEV | 0.47 | 0.00 | 0.00 | 0.01 | 0.04 | 1.44 | 0.13 | 8.59 |
| 2 | A | 49.90 | 10.036 | 3.028 | 0.668 | 9.36 | 62.8 | 7.07 | 99.1 |
|   | B | 51.15 | 10.036 | 3.028 | 0.676 | 9.48 | 71.2 | 8.21 | 105.3 |
|   | C | 52.72 | 10.036 | 3.028 | 0.685 | 9.64 | 77.6 | 9.18 | 107.5 |
|   | Average | 51.26 | 10.036 | 3.028 | 0.676 | 9.49 | 70.5 | 8.15 | 104.0 |
|   | STDEV | 1.41 | 0.00 | 0.00 | 0.01 | 0.14 | 7.42 | 1.06 | 4.36 |
| 3 | A | 49.95 | 10.041 | 3.026 | 0.683 | 9.16 | 56.2 | 6.61 | 89.3 |
|   | B | 51.12 | 10.041 | 3.026 | 0.687 | 9.32 | 61.4 | 7.31 | 99.4 |
|   | C | 52.78 | 10.041 | 3.026 | 0.701 | 9.44 | 64.2 | 7.95 | 98.6 |
|   | Average | 51.28 | 10.041 | 3.026 | 0.690 | 9.31 | 60.6 | 7.29 | 95.8 |
|   | STDEV | 1.42 | 0.00 | 0.00 | 0.01 | 0.14 | 4.06 | 0.67 | 5.61 |
| 4 | A | 49.24 | 10.036 | 3.026 | 0.684 | 9.03 | 54.2 | 6.39 | 90.9 |
|   | B | 49.94 | 10.036 | 3.026 | 0.687 | 9.12 | 61.5 | 7.32 | 96.2 |
|   | C | 53.07 | 10.036 | 3.026 | 0.701 | 9.49 | 64.9 | 8.04 | 101.2 |
|   | Average | 50.75 | 10.036 | 3.026 | 0.690 | 9.21 | 60.2 | 7.25 | 96.1 |
|   | STDEV | 2.04 | 0.00 | 0.00 | 0.01 | 0.25 | 5.47 | 0.83 | 5.15 |
| 5 | A | 49.79 | 10.039 | 3.025 | 0.680 | 9.18 | 47.8 | 5.58 | 88.6 |
|   | B | 51.52 | 10.039 | 3.025 | 0.689 | 9.38 | 50.9 | 6.09 | 86.9 |
|   | C | 53.88 | 10.039 | 3.025 | 0.705 | 9.59 | 50.7 | 6.35 | 100.6 |
|   | Average | 51.73 | 10.039 | 3.025 | 0.691 | 9.38 | 49.8 | 6.01 | 92.0 |
|   | STDEV | 2.05 | 0.00 | 0.00 | 0.01 | 0.20 | 1.73 | 0.39 | 7.47 |

Comparison of Boards 1 and 2 shows an increase in strength and hardness as indicated by the increased MOR, break load and hardness results. This comparison includes like amounts of binder with the addition of chitosan in Board 2. Thus, the chitosan increased these physical properties.

The amount of binder in Boards 2 and 3 is respectively reduced by 1% and 2%. The reduction in binder is not fully compensated for by the chitosan addition. Thus, Boards 3 and 4 are slightly weaker and softer, but within acceptable physical property value range. As used herein, acceptable physical properties means tested physical property values at least equal to about 95% of the values provided by an identically formed ceiling tile using the same ingredients except for the addition of the chitosan.

Even though slightly lower properties values may result, it should be appreciated that the more costly starch ingredient is reduced in amount in the constructions of Boards 2 and 3. In addition, the recycle newsprint may be increased in amount to replace the reduced starch content and to thereby increase the recycle and postindustrial/postconsumer content of the tile.

Board 5 is characterized by a decrease in strength and hardness greater than 5% of the control value. Such a decrease is presently deemed to exceed acceptable physical property values. Again, the recycle newsprint may be increased in amount to replace the reduced starch content and to thereby increase the recycle and postindustrial/postconsumer content of the tile.

Boards 1-5 were tested for their noise reduction, and more particularly, ENRC or the estimated noise reduction coefficient was determined. The ENRC test is based on ASTM C 384 Standard Test Method for Impedance and Absorption of Acoustical Material by the Impedance Tube Method. This test is used to predict sound absorption. It should be appreciated that the test results are only comparable for similarly prepared samples, e.g., the boards herein do not include further surface finishes or the like final treatments.

The test results are reported in following Table 4.

TABLE 4

ENRC

| Board # | Sample | ENRC |
|---|---|---|
| 1 | A | 0.33 |
|   | B | 0.30 |
|   | C | 0.29 |
|   | Average | 0.31 |
|   | STDEV | 0.02 |
| 2 | A | 0.31 |
|   | B | 0.31 |
|   | C | 0.29 |
|   | Average | 0.30 |
|   | STDEV | 0.01 |
| 3 | A | 0.30 |
|   | B | 0.29 |
|   | C | 0.33 |
|   | Average | 0.31 |
|   | STDEV | 0.02 |
| 4 | A | 0.30 |
|   | B | 0.33 |
|   | C | 0.31 |
|   | Average | 0.31 |
|   | STDEV | 0.02 |
| 5 | A | 0.37 |
|   | B | 0.28 |
|   | C | 0.30 |
|   | Average | 0.32 |
|   | STDEV | 0.05 |

As shown in Table 4, the use of chitosan does not detrimentally affect the ENRC, and the advantages of chitosan may be achieved without unacceptable reductions in this property.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A ceiling tile formed from an aqueous slurry of ingredients including fiber, filler, binder and chitosan, said ingredients being homogenously dispersed throughout the aqueous slurry for interacting of the chitosan with the other of said slurry ingredients whereby the ceiling tile formed of the aqueous slurry is structurally reinforced by the chitosan at least interacting with the binder as compared with an identically formed ceiling tile of the same slurry ingredients except for the chitosan, said fiber comprising at least one component of mineral wool, glass fiber and cellulose fiber, said filler comprising at least one component of perlite, calcium carbonate, clay and stucco, and said binder comprising at least one component of starch and latex.

2. The ceiling tile of claim 1, wherein said chitosan interacts with said ingredients to provide the ceiling tile with increased physical properties including MOR (modulus of rupture) as compared with a ceiling tile identically formed of the same slurry ingredients except for the chitosan.

3. The ceiling tile of claim 1, wherein the chitosan is present in an amount from about 1 wt % to about 6 wt % based on the total weight of the solids in the aqueous slurry.

4. The ceiling tile of claim 1, wherein the chitosan is dissolved in acid solution for addition to the slurry.

5. The ceiling tile of claim 1, wherein the slurry includes a reduced amount of binder in accordance with the amount of added chitosan to maintain physical properties and an amount of a recycled cellulose fiber material in accordance with the reduced amount of a binder whereby the postindustrial/postconsumer content of the tile is increased and structural reinforcement is maintained.

6. The ceiling tile of claim 5, wherein the physical properties include MOR (modulus of rupture) and hardness.

7. The ceiling tile of claim 1, wherein said chitosan interacts with said slurry ingredients during dewatering to remove an increased amount of water from the ceiling tile as compared with a ceiling tile identically formed of the same slurry ingredients except for the chitosan.

8. The ceiling tile of claim 1, wherein said ceiling tile has a composition including on a solids content weight basis:
fiber from about 5% to about 65%,
binder from about 3% to about 12%, and
chitosan from about 1% to about 6%.

9. An acoustic building material comprising the dried product of an aqueous slurry of ingredients including mineral fiber, filler, binder and chitosan all homogenously dispersed throughout the aqueous slurry, said chitosan interacting with the other of said slurry ingredients whereby the acoustic building material is structurally reinforced by the chitosan at least interacting with the binder as compared with an identically formed acoustic building material of the same slurry ingredients except for the chitosan, said fiber comprising at least one component of mineral wool, glass fiber and cellulose fiber, said filler comprising at least one component of perlite, calcium carbonate, clay and stucco, and said binder comprising at least one component of starch and latex.

10. The building material of claim 9, wherein said chitosan interacts with said slurry ingredients to provide the building material with increased mechanical properties including MOR (modulus of rupture) as compared with a building material identically formed of the same slurry ingredients except for the chitosan.

11. The building material of claim 9, wherein said chitosan is present in an amount from about 1 wt % to about 6 wt % based on the total weight of the solids in the aqueous slurry.

12. The building material claim 9, wherein the slurry includes a reduced amount of binder in accordance with the amount of added chitosan to maintain physical properties and an amount of a recycled cellulose fiber rce material in accordance with the reduced amount of binder.

13. The building material of claim 9, wherein said chitosan interacts with said slurry ingredients during dewatering to remove an increased amount of water from the building material as compared with a building material identically formed of the same slurry ingredients except for the chitosan and structural reinforcement is maintained.

14. A method for making an acoustic building material in a water felting process comprising forming an aqueous slurry of ingredients including mineral fiber, filler, binder of latex or starch and chitosan, homogenously dispersing said chitosan in said aqueous slurry, dewatering and drying said slurry to form said acoustical material, said chitosan interacting with the slurry ingredients whereby the acoustic building material is structurally reinforced by said chitosan as compared with an acoustic material identically formed of the same ingredients except for the chitosan.

15. The method of claim 14, wherein the chitosan is dissolved in acid solution and then added to the slurry.

16. The method of claim 15, wherein said chitosan interacts with said ingredients to provide said acoustic material with increased MOR (modulus of rupture) and hardness as compared with an acoustic material identically formed of the same ingredients except for the chitosan.

17. The method of claim 14, wherein the step of the dewatering said slurry includes removing an increased amount of water due to the presence of chitosan as compared with an identical dewatering step of a slurry having an identical composition except for the chitosan.

18. The method of claim 14, wherein the chitosan is present in an amount from about 1 wt % to about 6 wt % based on the total weight of the solids in the aqueous slurry, and the slurry includes a reduced amount of binder in accordance with the amount of added chitosan to maintain physical properties and an amount of a recycled cellulose fiber material in accordance with the reduced amount of binder whereby the postindustrial/postconsumer content of the building material is increased and structural reinforcement is maintained.

* * * * *

UNITED STATES PATENT AND TRADEMARK OFFICE
CERTIFICATE OF CORRECTION

PATENT NO.       : 8,961,675 B2                                              Page 1 of 1
APPLICATION NO.  : 13/294200
DATED            : February 24, 2015
INVENTOR(S)      : Albarran It is certified that error appears in the above-identified patent and that said Letters Patent is hereby corrected as shown below:

In the Claims

Column 8, line 16 Claim 12, after "fiber" delete "rce".

Signed and Sealed this
Twenty-eighth Day of July, 2015

Michelle K. Lee
*Director of the United States Patent and Trademark Office*